L. W. Boynton,
Wool-Washing Machine,

N°11,659. Patented Sept. 12, 1854.

UNITED STATES PATENT OFFICE.

LEANDER W. BOYNTON, OF SOUTH COVENTRY, CONNECTICUT.

MACHINE FOR CLEANING WOOL.

Specification of Letters Patent No. 11,659, dated September 12, 1854.

*To all whom it may concern:*

Be it known that I, LEANDER W. BOYNTON, of South Coventry, in the county of Tolland and State of Connecticut, have invented a new and useful Improvement in Machinery for Cleansing Wool, &c.; and I do hereby declare that the following is a full, clear, and exact description of the construction, character, and operation of the same, reference being had to the accompanying drawings, which make a part of this specification, in which—

Figure 1:
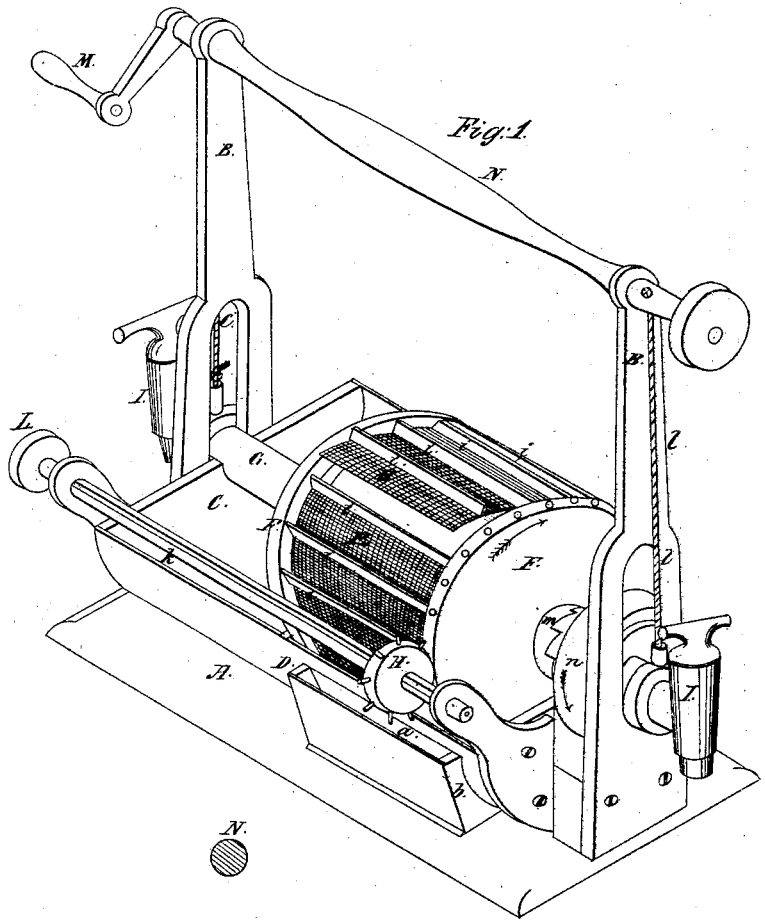
Figure 2:
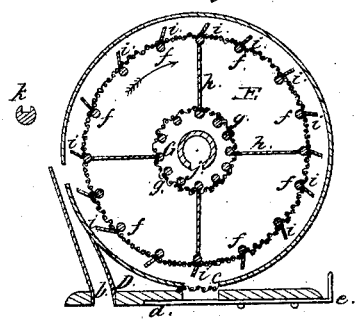

Figure 1, is a perspective view of the whole apparatus, as it appears when ready to receive the wool, &c. Fig. 2, is a cross section of the same, showing the relative position of the several parts while rinsing and drying the wool, &c.

My improvement consists in placing a cylinder of wire cloth, or other suitable material (similar to that described in the schedule of my Letters Patent issued August 12, 1851,) in a horizontal position, on a hollow mandrel, or shaft, in a vat, or vessel containing two horizontal apartments, (in one of which apartments I put the cleansing liquor and into the other flows the clear water for rinsing,). And when it is desired to dry the wool, (the water being let out of the rinsing apartment,) the cylinder will be revolved in the opposite direction, very rapidly, so as to throw out the water by centrifugal force. And to remove any remaining moisture, hot air may be passed through the hollow mandrel into the wool, as hereafter explained.

I make the frame of a platform, or base, A, and two posts, or perpendiculars, B, and B, of wood, or any other suitable material. On this platform, and between these posts, I place the vats, C, and D. In the side of the vat D, I make an opening, or aperture, *a*, to let out the surplus rinsing water (which flows off through the spout *b*, Figs. 1, and 2.) And I also make an opening in the bottom of the vat, D, and through the platform, where it is covered with wire-cloth,) as seen at *c*, Fig. 2, to let out all of the rinsing water. This lower opening is closed, while rinsing the wool, by a slide, *d*, which is moved back and forth, at pleasure, by the rod and handle, *e*, all shown in section in Fig. 2.

I make the hollow cylinder C, with two heads, or ends, as seen at F, and F, Fig. 1, (of wood, or any other suitable material,) and sustain them in their position by bars extending from one end to the other, as indicated in section at *f*, *f*, &c., Fig. 2. And these bars, *f*, *f*, &c., sustain the wire cloth which forms the periphery of the cylinder as shown in the drawings. And to prevent the wool from winding round the mandrel, G, (on which the cylinder revolves,) and that the liquors, &c., may have free access to all parts of the wool, I form an inner cylinder of bars and wire cloth, as indicated, in section, at *g*, *g*, Fig. 2. And to prevent the wool from collecting too much on one side, I divide the cylinder into four, (or other convenient number of) parts by longitudinal partitions, as shown at *h*, *h*, *h*, *h*, Fig. 2. And I have a door in each part as seen at H, Fig. 1.

On the periphery of the cylinder I attach a suitable number of buckets, as shown at *i*, *i*, &c., Figs. 1, and 2, so that when the cylinder is revolved slowly in the direction indicated by the dart, the buckets, *i*, *i*, &c., will take up the cleansing liquor, or water, and pass it through the wire cloth onto the upper part of the wool so as to essentially equalize the supply.

I make the mandrel, G, (of iron or any other suitable material,) hollow, as seen at G, Fig. 2. And in the part contained in the apartment D, of the vat, I cut a longitudinal slot on the under side, as shown at *j*, Fig. 2, through which the rinsing water is admitted into the cylinder, and, also, the hot air to dry the wool. At each end of this hollow mandrel I have a faucet, I, and I, or some other suitable means, for admitting the water to rinse the wool, and, also, the hot air for drying it.

Having thus constructed the several parts of the apparatus, I place the cylinder, C, in the apartment, C, of the vat, (which contains the cleansing liquor,) and put the wool into the several apartments in the cylinder, through the doors, (as at H,) and give the cylinder a slow revolving motion, (in the direction indicated by the dart,) by means of a spur wheel, R, working in holes, or mortices, (the shaft of K, being revolved by a band on the pulley L,) or by any other convenient means. While the cylinder is thus revolving, the buckets, *i*, *i*, &c., will be continually taking up the liquor, and again discharging it upon the upper part of the wool, to equalize the contact of the liquor and wool; this process is continued until the wool is thoroughly cleansed.

When the wool is thoroughly cleansed I throw the spur-wheel, R, out of gear, and with the crank, M, revolve the shaft, N, and by means of the cords, l, and l, raise the cylinder, E, out of the vat, and allow it to drain as long as thought best. I then remove the cylinder, E, horizontally on the shaft, G, until it is over the apartment, D, of the vat; and by means of the crank, M, &c., let it down into that apartment, as it is represented in Fig. 1, (or raise and lower it by any other convenient means, as may be most suitable in any case.) I then let in the rinsing water through one, or both of the faucets, I, and I, when by means of the slot, j, in the under side of the hollow shaft, the water will pour through onto the wool, and through the wool into the apartment, D, of the vat, I then revolve the cylinder, C, slowly, by means of the spur-wheel K, &c., as before described, the buckets, i, i, &c., taking up and distributing the waters &c. until the wool is perfectly rinsed. I then let out the water by pushing aside the slide, d, Fig. 2, and throw the spur-wheel K, out of gear, and bring the ratchet wheel, m, in gear with the teeth on the loose pulley, n, as shown in Fig. 1, and by means of a band on the pulley, n, revolve the cylinder, E, (in the direction indicated by the dent in the pulley, n,) with sufficient rapidity to throw the water out of the wool by centrifugal force. And when the water has been thus thrown out, to render the wool perfectly dry, I force in hot air through the faucets, I and I, and so through the wool, until the moisture is entirely expelled. And should it be desired to color the wool, I have only to extend the frame of the apparatus, and the hollow shaft, G, sufficiently to form another apartment like, C, (at the opposite side of D,) to contain the coloring liquor; so that after the wool is washed and dried, I have only to raise the cylinder, as before, and slide it longitudinally on the shaft till it is over the coloring apartment of the vat, and then let it down into the coloring liquor, and revolve it slowly as in cleansing, &c., (raising it occasionally to air it, if necessary,) until it is colored, and then remove it back to the apartment, D, to again rinse it, and afterward dry it as before described. And should more than one dye be required, additional apartment may be used; so that the wool may be cleansed, rinsed, dried, colored, rinsed and dried again, without taking it out of the cylinder, or handling it in any way.

What I claim as my invention and desire to secure by Letters Patent, is—

The combination of the cylinder, E, with the hollow mandrel, G, when these are combined with the horizontal vat, divided into two, or more, apartments, and the whole is constructed, arranged, combined, and made to operate, substantially, as herein described.

LEANDER W. BOYNTON.

Witnesses:
S. RANSOM,
R. FITZGERALD.